(12) United States Patent
Shackelford et al.

(10) Patent No.: US 9,027,457 B1
(45) Date of Patent: May 12, 2015

(54) VEHICLE AND STRUCTURE FILM/HARD POINT SHIELD

(71) Applicant: Foster-Miller, Inc., Waltham, MA (US)

(72) Inventors: Justin Trent Shackelford, Milford, MA (US); John D. Larouco, Milford, MA (US)

(73) Assignee: Foster-Miller, Inc., Waltham, MA (US)

( * ) Notice: Subject to any disclaimer, the term of this patent is extended or adjusted under 35 U.S.C. 154(b) by 0 days.

(21) Appl. No.: 14/336,223

(22) Filed: Jul. 21, 2014

Related U.S. Application Data

(62) Division of application No. 13/766,031, filed on Feb. 13, 2013, now Pat. No. 8,813,631.

(51) Int. Cl.
*F41H 7/02* (2006.01)
*F41H 5/04* (2006.01)

(52) U.S. Cl.
CPC .................................. *F41H 5/0492* (2013.01)

(58) Field of Classification Search
CPC ..... F41H 5/0492; F41H 5/1471; F41H 5/013; F41H 5/0414; F41H 5/0428; F41H 5/023; F41H 7/02; F41H 5/24; F41H 5/026
USPC ............ 89/36.02, 36.04, 36.07, 36.08, 36.09, 89/920, 929, 930, 939
See application file for complete search history.

(56) References Cited

U.S. PATENT DOCUMENTS

| | | | |
|---|---|---|---|
| 1,198,035 | A | 9/1916 | Huntington |
| 1,204,547 | A | 11/1916 | Corrado et al. |
| 1,229,421 | A | 6/1917 | Downs |
| 1,235,076 | A | 7/1917 | Stanton |
| 1,274,624 | A | 8/1918 | Steinmetz |
| 1,367,249 | A | 2/1921 | Goodyear |
| 1,385,897 | A | 7/1921 | Tresidder |
| 1,552,269 | A | 9/1925 | Brocker |
| 2,238,779 | A | 4/1941 | Mosebach |
| 2,296,980 | A | 9/1942 | Carmichael |
| 2,308,683 | A | 1/1943 | Forbes |
| 2,322,624 | A | 6/1943 | Forbes |
| 3,608,034 | A | 9/1971 | Bramley et al. |
| 3,633,936 | A | 1/1972 | Huber |
| 3,656,790 | A | 4/1972 | Truesdell |
| 3,656,791 | A | 4/1972 | Truesdell |

(Continued)

FOREIGN PATENT DOCUMENTS

| | | |
|---|---|---|
| DE | 691067 | 5/1940 |
| DE | 2206404 | 2/1972 |

(Continued)

OTHER PUBLICATIONS

Written Opinion of the International Searching Authority mailed Jan. 7, 2010 for International Application No. PCT/US2009/002363, 5 pages, unnumbered.
Written Opinion of the International Searching Authority mailed, dated Dec. 23, 2011 for International Application No. PCT/US2011/01462, 6 pages, unnumbered.
File History of U.S. Patent Publication No. 2008/0164379 (through Mar. 1, 2011), 304 pages, unnumbered.
Written Opinion of the International Searching Authority mailed Nov. 13, 2012 for International Application No. PCT/US2011/01459, 5 pages, unnumbered.

(Continued)

*Primary Examiner* — Bret Hayes
*Assistant Examiner* — Joshua Freeman
(74) *Attorney, Agent, or Firm* — Iandiorio, Teska & Coleman, LLP

(57) ABSTRACT

A shield includes a film with members intersecting at spaced nodes, a hard point fixed at least at select nodes, and a frame at least partially about the film for spacing the film from a vehicle or structure to be protected.

16 Claims, 5 Drawing Sheets

(56) References Cited

U.S. PATENT DOCUMENTS

| | | |
|---|---|---|
| 3,733,243 A | 5/1973 | Crawford |
| 3,893,368 A | 7/1975 | Wales, Jr. |
| 3,950,584 A | 4/1976 | Bramley |
| 3,992,628 A | 11/1976 | Karney |
| 4,051,763 A | 10/1977 | Thomanek |
| 4,157,411 A | 6/1979 | Thomson |
| 4,253,132 A | 2/1981 | Cover |
| 4,262,595 A | 4/1981 | Longerich |
| 4,358,984 A | 11/1982 | Winblad |
| 4,399,430 A | 8/1983 | Kitchen |
| 4,411,462 A | 10/1983 | Buehrig et al. |
| 4,688,024 A | 8/1987 | Gadde |
| 4,768,417 A | 9/1988 | Wright |
| 4,912,869 A | 4/1990 | Govett |
| 4,928,575 A | 5/1990 | Smirlock et al. |
| 4,950,198 A | 8/1990 | Repko, Jr. |
| 5,007,326 A | 4/1991 | Gooch, Jr. et al. |
| 5,025,707 A | 6/1991 | Gonzalez |
| 5,069,109 A | 12/1991 | Lavan, Jr. |
| 5,078,117 A | 1/1992 | Cover |
| 5,094,170 A | 3/1992 | Raynaud et al. |
| 5,170,690 A | 12/1992 | Smirlock et al. |
| 5,191,166 A | 3/1993 | Smirlock et al. |
| 5,279,199 A | 1/1994 | August |
| 5,291,715 A | 3/1994 | Basile |
| 5,333,532 A | 8/1994 | Smirlock et al. |
| 5,342,021 A | 8/1994 | Watson |
| 5,370,035 A | 12/1994 | Madden, Jr. |
| 5,394,786 A | 3/1995 | Gettle et al. |
| 5,400,688 A | 3/1995 | Eninger et al. |
| 5,435,226 A | 7/1995 | McQuilkin |
| 5,441,239 A | 8/1995 | Watson |
| 5,524,524 A | 6/1996 | Richards et al. |
| 5,578,784 A | 11/1996 | Karr et al. |
| 5,583,311 A | 12/1996 | Rieger |
| 5,609,528 A | 3/1997 | Kehoe |
| 5,622,455 A | 4/1997 | Anderson et al. |
| 5,646,613 A | 7/1997 | Cho |
| 5,705,058 A | 1/1998 | Fischer |
| 5,725,265 A | 3/1998 | Baber |
| 5,739,458 A | 4/1998 | Girard |
| 5,750,918 A | 5/1998 | Mangolds et al. |
| 5,792,976 A | 8/1998 | Genovese |
| 5,842,939 A | 12/1998 | Pui et al. |
| 5,898,125 A | 4/1999 | Mangolds et al. |
| 5,924,723 A | 7/1999 | Brantman et al. |
| 5,988,036 A | 11/1999 | Mangolds et al. |
| 6,029,558 A | 2/2000 | Stevens et al. |
| 6,119,574 A | 9/2000 | Burkey et al. |
| 6,128,999 A | 10/2000 | Sepp et al. |
| 6,279,449 B1 | 8/2001 | Ladika et al. |
| 6,279,499 B1 | 8/2001 | Griffith St. et al. |
| 6,282,860 B1 | 9/2001 | Ramirez |
| 6,311,605 B1 | 11/2001 | Kellner et al. |
| 6,325,015 B1 | 12/2001 | Garcia et al. |
| 6,374,565 B1 | 4/2002 | Warren |
| 6,375,251 B1 | 4/2002 | Taghaddos |
| 6,394,016 B2 | 5/2002 | Swartout et al. |
| 6,499,796 B1 | 12/2002 | Eenhoorn |
| 6,595,102 B2 | 7/2003 | Stevens et al. |
| 6,626,077 B1 | 9/2003 | Gilbert |
| 6,672,220 B2 | 1/2004 | Brooks et al. |
| 6,782,792 B1 | 8/2004 | Edberg et al. |
| 6,805,035 B2 | 10/2004 | Edberg et al. |
| 6,854,374 B1 | 2/2005 | Breazeale |
| 6,901,839 B2 | 6/2005 | Edberg et al. |
| 6,904,838 B1 | 6/2005 | Dindl |
| 6,925,771 B2 | 8/2005 | Lee et al. |
| 6,957,602 B1 | 10/2005 | Koenig et al. |
| 7,177,518 B2 | 2/2007 | Chun |
| 7,190,304 B1 | 3/2007 | Carlson |
| 7,244,199 B1 | 7/2007 | Romano |
| 7,308,738 B2 | 12/2007 | Barvosa-Carter et al. |
| 7,318,258 B2 | 1/2008 | Chun |
| 7,328,644 B2 | 2/2008 | Vickroy |
| 7,412,916 B2 | 8/2008 | Lloyd |
| 7,415,917 B2 | 8/2008 | Lloyd |
| 7,513,186 B2 | 4/2009 | Ravid et al. |
| 7,866,248 B2 | 1/2011 | Moore, III et al. |
| 7,866,250 B2 | 1/2011 | Farinella et al. |
| 8,011,285 B2 | 9/2011 | Farinella et al. |
| 8,132,495 B2 | 3/2012 | Joynt |
| 2001/0032577 A1 | 10/2001 | Swartout et al. |
| 2001/0048102 A1 | 12/2001 | Telles |
| 2002/0134365 A1 | 9/2002 | Gray |
| 2003/0217502 A1 | 11/2003 | Hansen |
| 2004/0016846 A1 | 1/2004 | Blackwell-Thompson et al. |
| 2005/0011396 A1 | 1/2005 | Burdette et al. |
| 2005/0016372 A1 | 1/2005 | Kilvert |
| 2005/0278098 A1 | 12/2005 | Breed |
| 2006/0065111 A1 | 3/2006 | Henry |
| 2006/0112817 A1 | 6/2006 | Lloyd |
| 2007/0057495 A1 | 3/2007 | Tesch et al. |
| 2007/0089597 A1 | 4/2007 | Ma |
| 2007/0180983 A1 | 8/2007 | Farinella et al. |
| 2008/0164379 A1 | 7/2008 | Wartmann et al. |
| 2008/0258063 A1 | 10/2008 | Rapanotti |
| 2009/0084284 A1 | 4/2009 | Martinez et al. |
| 2009/0104422 A1 | 4/2009 | Sampson |
| 2009/0173250 A1 | 7/2009 | Marscher et al. |
| 2009/0178597 A1 | 7/2009 | Silwa, Jr. |
| 2009/0217811 A1 | 9/2009 | Leeming |
| 2009/0266226 A1 | 10/2009 | Beach et al. |
| 2009/0266227 A1 | 10/2009 | Farinella et al. |
| 2009/0308238 A1 | 12/2009 | Schwartz |
| 2010/0282935 A1 | 11/2010 | Zannoni |
| 2010/0288114 A1 | 11/2010 | Soukos |
| 2010/0294124 A1 | 11/2010 | Wentzel |
| 2010/0307328 A1 | 12/2010 | Hoadley et al. |
| 2011/0067561 A1 | 3/2011 | Joynt |
| 2011/0079135 A1 | 4/2011 | Farinella et al. |
| 2011/0136087 A1 | 6/2011 | Corridon |
| 2011/0179944 A1 | 7/2011 | Farinella et al. |
| 2011/0185614 A1 | 8/2011 | Laney et al. |
| 2011/0192014 A1 | 8/2011 | Holmes, Jr. et al. |
| 2011/0203453 A1 | 8/2011 | Farinella et al. |
| 2011/0252955 A1 | 10/2011 | Radstake et al. |
| 2012/0011993 A1 | 1/2012 | Malone et al. |
| 2012/0046916 A1 | 2/2012 | Farinella et al. |
| 2012/0067199 A1 | 3/2012 | Farinella et al. |
| 2012/0180639 A1 | 7/2012 | Farinella et al. |

FOREIGN PATENT DOCUMENTS

| | | |
|---|---|---|
| DE | 2409876 | 9/1975 |
| DE | 2507351 | 9/1976 |
| DE | 3722420 | 1/1989 |
| DE | 3735426 | 5/1989 |
| DE | 3834367 | 4/1990 |
| DE | 4437412 | 9/1995 |
| EP | 0655603 | 5/1995 |
| EP | 0872705 | 10/1998 |
| EP | 0902250 | 3/1999 |
| FR | 2695467 | 3/1994 |
| GB | 2449055 | 11/2008 |
| WO | WO 99/30966 | 6/1999 |
| WO | WO 2006/134407 | 12/2006 |
| WO | WO 2006/135432 | 12/2006 |
| WO | WO 2008/070001 | 6/2008 |
| WO | WO 2008/079001 | 7/2008 |

OTHER PUBLICATIONS

Written Opinion of the International Searching Authority mailed Jan. 31, 2013 for International Application No. PCT/US 2012/63207 (six (6) pages total).

Written Opinion of the International Searching Authority mailed May 30, 2014 for International Application No. PCT/US 2014/015785 (five (5) pages total).

VEHICLE AND STRUCTURE FILM/HARD POINT SHIELD

RELATED APPLICATIONS

This application is a divisional of U.S. patent application Ser. No. 13/766,031 filed Feb. 13, 2013 which hereby claims the benefit of and priority thereto under 35 U.S.C. §§119, 120, 363, 365, and 37 C.F.R. §1.55 and §1.78, which application is incorporated herein by this reference.

Related applications include U.S. patent application Ser. No. 12/807,532 filed Sep. 8, 2010; U.S. patent application Ser. No. 12/386,114 filed Apr. 14, 2009; U.S. Provisional Application Ser. No. 61/124,428 filed Apr. 16, 2008; and U.S. patent application Ser. No. 13/200,296 filed Sep. 22, 2011.

FIELD OF THE INVENTION

The subject invention relates to ordnance shielding.

BACKGROUND OF THE INVENTION

Rocket propelled grenades (RPGs) and other ordnance are used by terrorist groups to target military vehicles and structures. See WO 2006/134407 incorporated herein by this reference.

Others skilled in the art have designed intercept vehicles which deploy a net or a structure in the path of an RPG in an attempt to change its trajectory. See U.S. Pat. Nos. 7,190,304; 6,957,602; 5,578,784; and 7,328,644 all incorporated herein by this reference. Related prior art discloses the idea of deploying an airbag (U.S. Pat. No. 6,029,558) or a barrier (U.S. Pat. No. 6,279,499) in the trajectory path of a munition to deflect it. These references are also included herein by this reference.

Many such systems require detection of the RPG and deployment of the intercept vehicle quickly and correctly into the trajectory path of the RPG.

Static armor such as shown in U.S. Pat. Nos. 5,170,690; 5,191,166; 5,333,532; 4,928,575; and WO 2006/134,407 is often heavy and time consuming to install. When a significant amount of weight is added to a HMMWV, for example, it can become difficult to maneuver and top heavy. Such an armor equipped vehicle also burns an excessive amount of fuel.

Moreover, known static systems do not prevent detonation of the RPG. One exception is the steel grille armor of WO 2006/134,407 which is said to destroy and interrupt the electrical energy produced by the piezoelectric crystal in the firing head of the RPG. Bar/slat armor is also designed to dud an RPG. But, bar/slat armor is also very heavy. Often, a vehicle designed to be carried by a specific class of aircraft cannot be carried when outfitted with bar/slat armor. Also, if the bar/slat armor is hit with a strike, the RPG still detonates. Bar/slat armor, if damaged, can block doors, windows, and access hatches of a vehicle.

Chain link fence type shields have also been added to vehicles. The chain link fencing, however, is not sufficiently compliant to prevent detonation of an RPG if it strikes the fencing material. Chain like fencing, although lighter than bar/slat armor, is still fairly heavy. Neither bar/slat armor nor the chain link fence type shield is easy to install and remove.

Despite the technology described in the above prior art, Rocket Propelled Grenades (RPGs) and other threats used by enemy forces and insurgents remain a serious threat to troops on the battlefield, on city streets, and on country roads. RPG weapons are relatively inexpensive and widely available throughout the world. There are varieties of RPG warhead types, but the most prolific are the PG-7 and PG-7M which employ a focus blast or shaped charge warhead capable of penetrating considerable armor even if the warhead is detonated at standoffs up to 10 meters from a vehicle. A perfect hit with a shaped charge can penetrate a 12 inch thick steel plate. RPGs pose a persistent deadly threat to moving ground vehicles and stationary structures such as security check points.

Heavily armored, lightly armored, and unarmored vehicles have been proven vulnerable to the RPG shaped charge. Pick-up trucks, HMMWV's, 2½ ton trucks, 5 ton trucks, light armor vehicles, and M118 armored personnel carriers are frequently defeated by a single RPG shot. Even heavily armored vehicles such as the M1 Abrams Tank have been felled by a single RPG shot. The PG-7 and PG-7M are the most prolific class of warheads, accounting for a reported 90% of the engagements. RPG-18s, RPG-69s, and RPG-7Ls have been reported as well, accounting for a significant remainder of the threat encounters. Close engagements 30 meters away occur in less than 0.25 seconds and an impact speed ranging from 120-180 m/s. Engagements at 100 meters will reach a target in approximately 1.0 second and at impact speeds approaching 300 m/s.

The RPG-7 is in general use in Africa, Asia, and the Middle East and weapon caches are found in random locations making them available to the inexperienced insurgent. Today, the RPG threat is present at every turn and caches have been found under bridges, in pickup trucks, buried by the road sides, and even in churches.

Armor plating on a vehicle does not always protect the occupants in the case of an RPG impact and no known countermeasure has proven effective. Systems designed to intercept and destroy an incoming threat are ineffective and/or expensive, complex, and unreliable.

Chain link fencing has been used in an attempt to dud RPGs by destroying the RPG nose cone. See, for example, DE 691,067. See also published U.S. Patent Application No. 2008/0164379. Others have proposed using netting to strangulate the RPG nose cone. See published U.S. Application No. 2009/0217811 and WO 2006/135432.

WO 2006/134407, insofar as it can be understood, discloses a protective grid with tooth shaped members. U.S. Pat. No. 6,311,605 discloses disruptive bodies secured to armor. The disruptive bodies are designed to penetrate into an interior region of a shaped charge to disrupt the formation of the jet. The shaped charge disclosed has a fuse/detonator mechanism in its tail end.

BRIEF SUMMARY OF THE INVENTION

Applicant's pending U.S. Patent Application Publication No. 2009/0266227, incorporated herein by this reference, discloses a novel vehicle protection system. The following reflects an enhancement to such a system.

A film supports a spaced array of hard points at a set off distance from a vehicle or a structure and the hard points are designed to dig or tear into the nose cone of an RPG and dud it.

Featured is a shield comprising a film including members intersecting at spaced nodes, a hard point fixed at least at select nodes, and a frame at least partially about the film for spacing the film from a vehicle or structure to be protected.

The film may include at least two plies and then the hard points may be located at select nodes between two plies of the film. In one example, each node includes opposing cup-shaped portions. The plies can be welded together. One benefit of this design is the hard points can be unitary members.

In another version, each hard point includes two halves joined together on opposite sides of a film node. Preferably, the halves have the same configuration. In one version, a pin extends through a film node and is secured on each end to a hard point half.

One shield manufacturing method includes forming a first film ply to include, members intersecting at nodes, placing a hard point at least at select nodes, and placing a second film including members intersecting at nodes over the first film ply and the hard points fixing the hard points at their respective nodes.

Another shield manufacturing method comprises forming a film to include members intersecting at nodes, fabricating hard points each including two halves joinable together, and joining together the hard point halves at least at select nodes of the film to fix the hard points at their respective nodes.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features, and advantages will occur to those skilled in the art from the following description of a preferred embodiment and the accompanying drawings, in which.

DETAILED DESCRIPTION OF THE INVENTION

In a state of the art hard point shield developed by the applicant, each hard point secures within it a net node.

There may be other desirable ways of fashioning hard points and spacing them from a vehicle or structure which can be implemented in certain circumstances.

Figure 1:
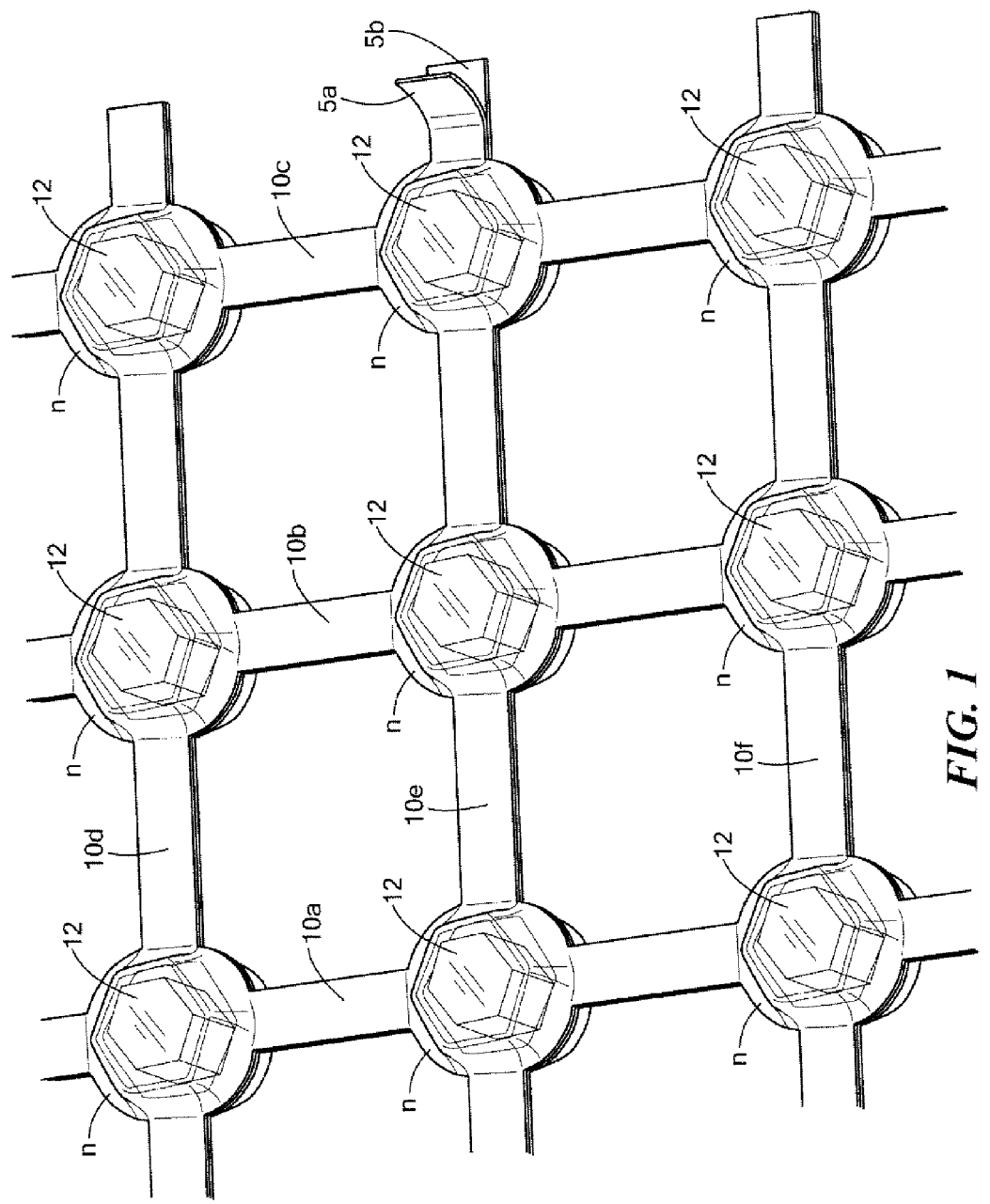
FIG. 1 is a schematic top view showing an example of a vehicle or structure shield in accordance with the invention.
Figure 2:
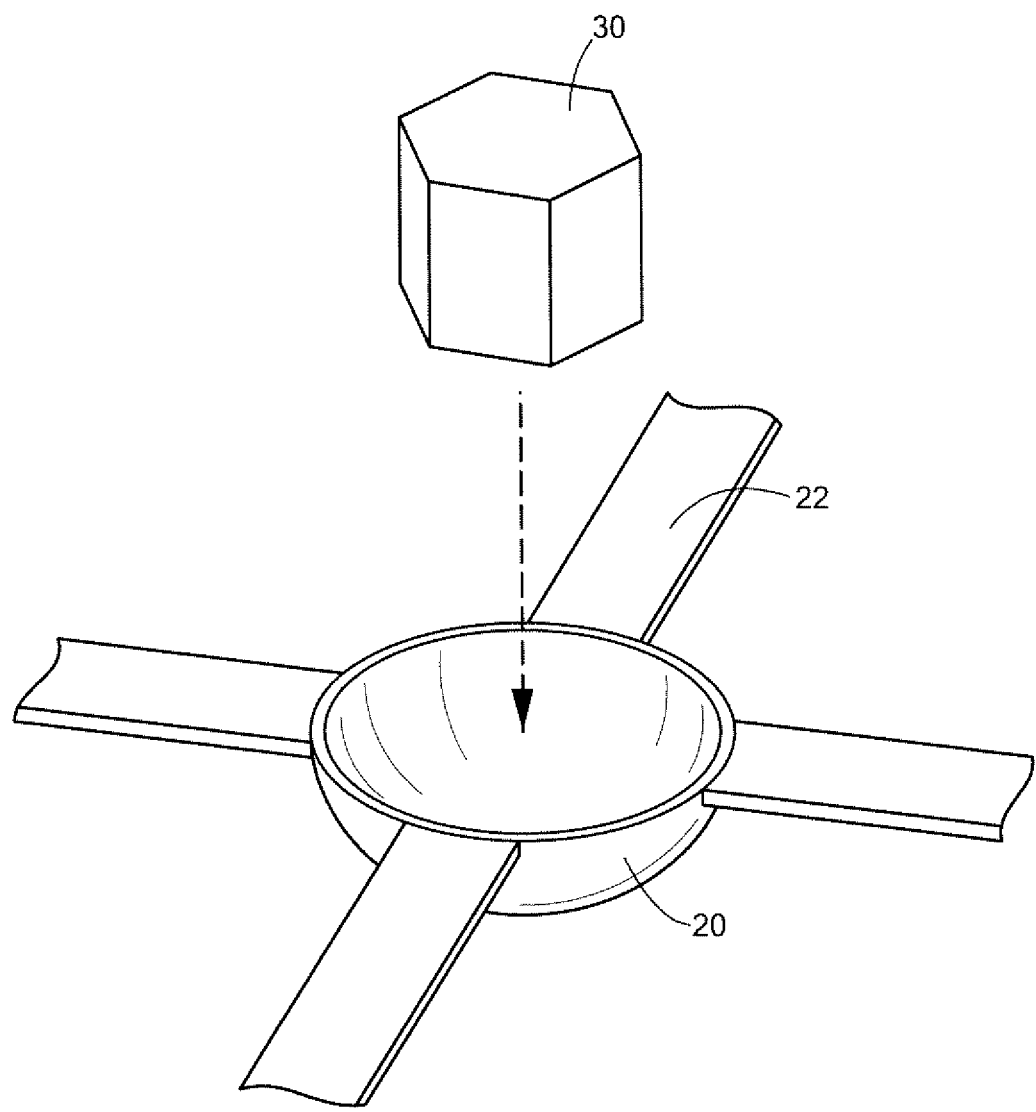
FIG. 2 is a schematic exploded top view showing a node of the shield of FIG. 1.

FIG. 1, for example, shows two plies 5a, 5b of film defining spaced members 10a-10e intersecting spaced members 10d-10f at nodes n in a grid like fashion. At the nodes, sandwiched between the two plies, is a hard point 12. Here, each node n includes opposing cupped shaped portions as shown at 20 in FIG. 2 for ply 22. Hard points are placed in the cups of one ply, the other ply is placed on the first ply, and they are sealed, laminated, welded, and/or glued together. In one example, the first ply is vacuum formed to define the cupped shaped nodes, the hard points are positioned in their respective cup shaped nodes, and the top ply is then vacuum formed over the hard points and ultrasonically welded to the first ply. Now, the hard points can be unitary in construction, e.g., sharp edged and corned members as at 30 in FIG. 2.

Figure 3:
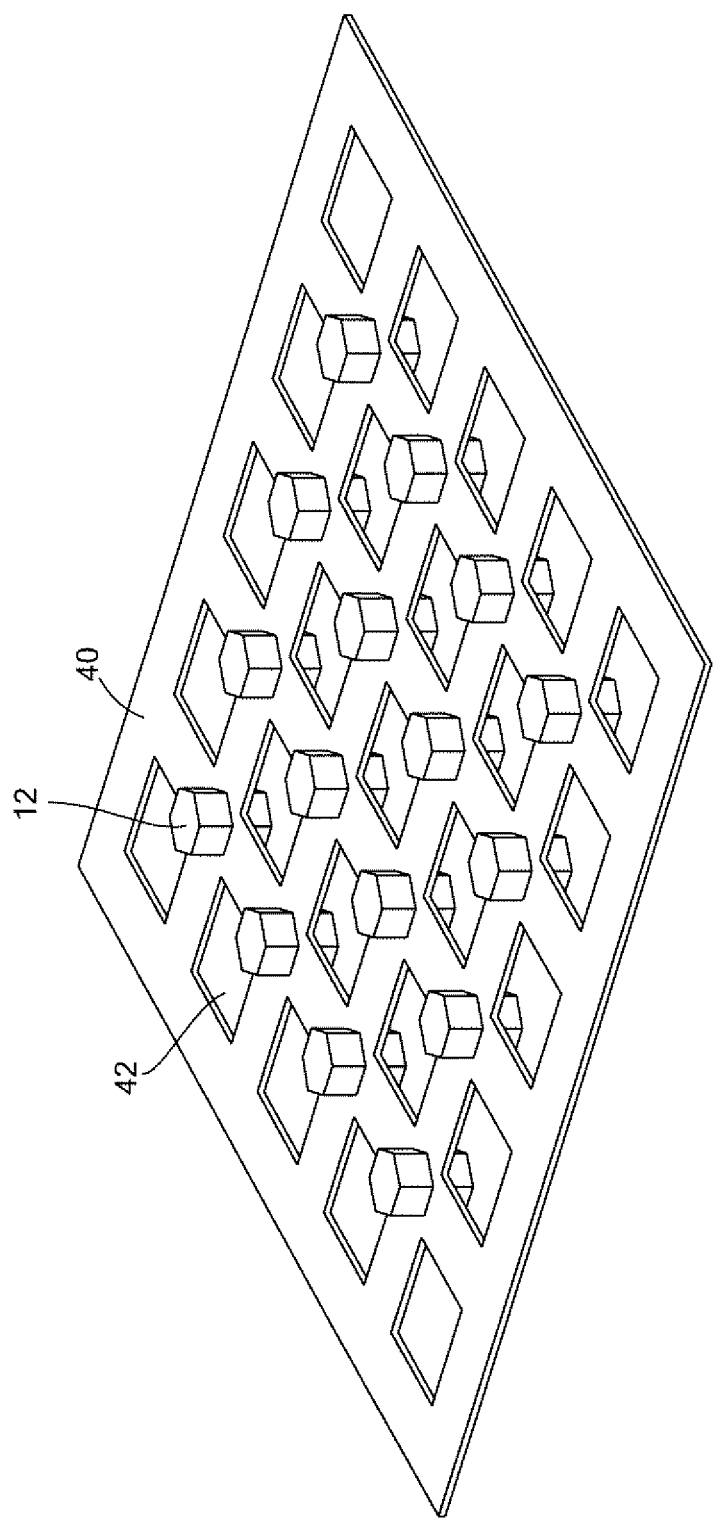
FIG. 3 is a schematic three-dimensional top view showing an example of another shield in accordance with the invention.

In FIG. 3, film 40 is single ply in construction and includes members intersecting at nodes as shown. Again, a hard point is fixed at each node. The film could be manufactured as shown in FIG. 3 or could be produced as a solid sheet of material and then be processed by cutting out the portions shown at 42.

Figure 4:
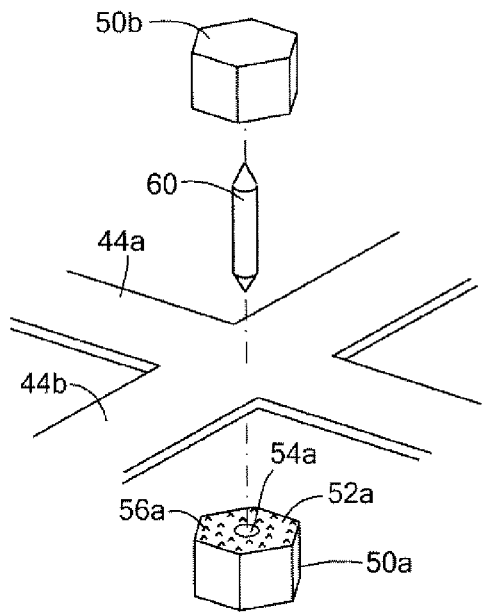
FIG. 4 is an exploded three dimensional schematic view showing a node of the shield of FIG. 3.
Figure 5:
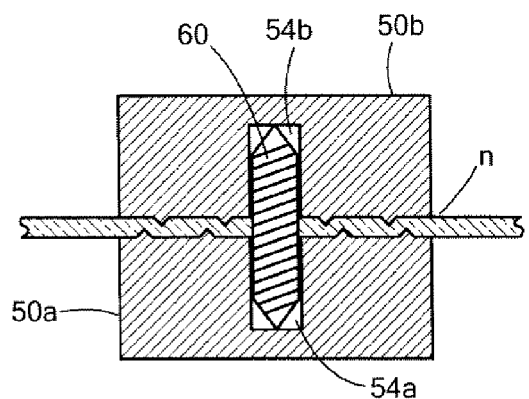
FIG. 5 is a schematic cross sectional side view of a node of the shield shown in FIG. 3.

In this example, each hard point may have two halves joined together on opposite sides of each node. FIG. 4 shows an example where node n is defined by intersecting film members 44a and 44b. Hard point half 50a includes face 52a with opening 54a therein. Face 52a also includes pointed teeth 56a thereon. Hard point half 50b is similarly constructed and has the same configuration. Pin 60, FIGS. 4-5 locks the two hard points halves at the node on opposite sides of the film ply as shown in FIG. 5 where pin 60 pierces the film at the node and is press fit into both hard point halves 50a and 50b. The pointed teeth on each hard point also serve to lock each hard point to the film material. Pin 60 can first be driven into hard point half 50a. Pin 60 then pierces the film and is driven into hard point half 50b.

Figure 6:
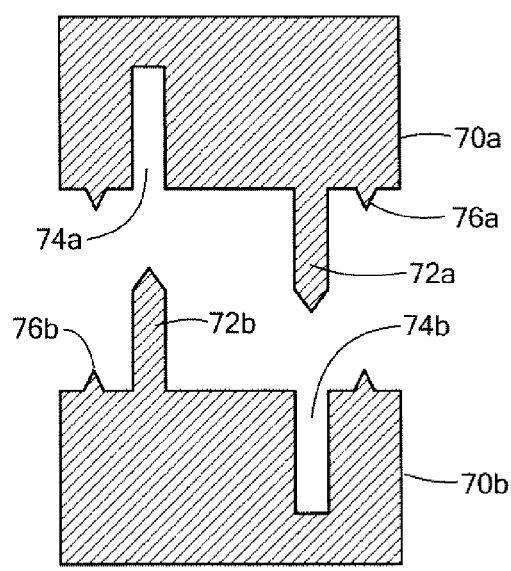
FIG. 6 is a schematic cross sectional view showing another example of a hard point configuration in accordance with the invention.

FIG. 6 shows another hard point design where each hard point half 70a, 70b, includes a pin 72, pin receiving cavity 74, and teeth 76. In this way, the hard point halves mate together about a film node.

Figure 7:
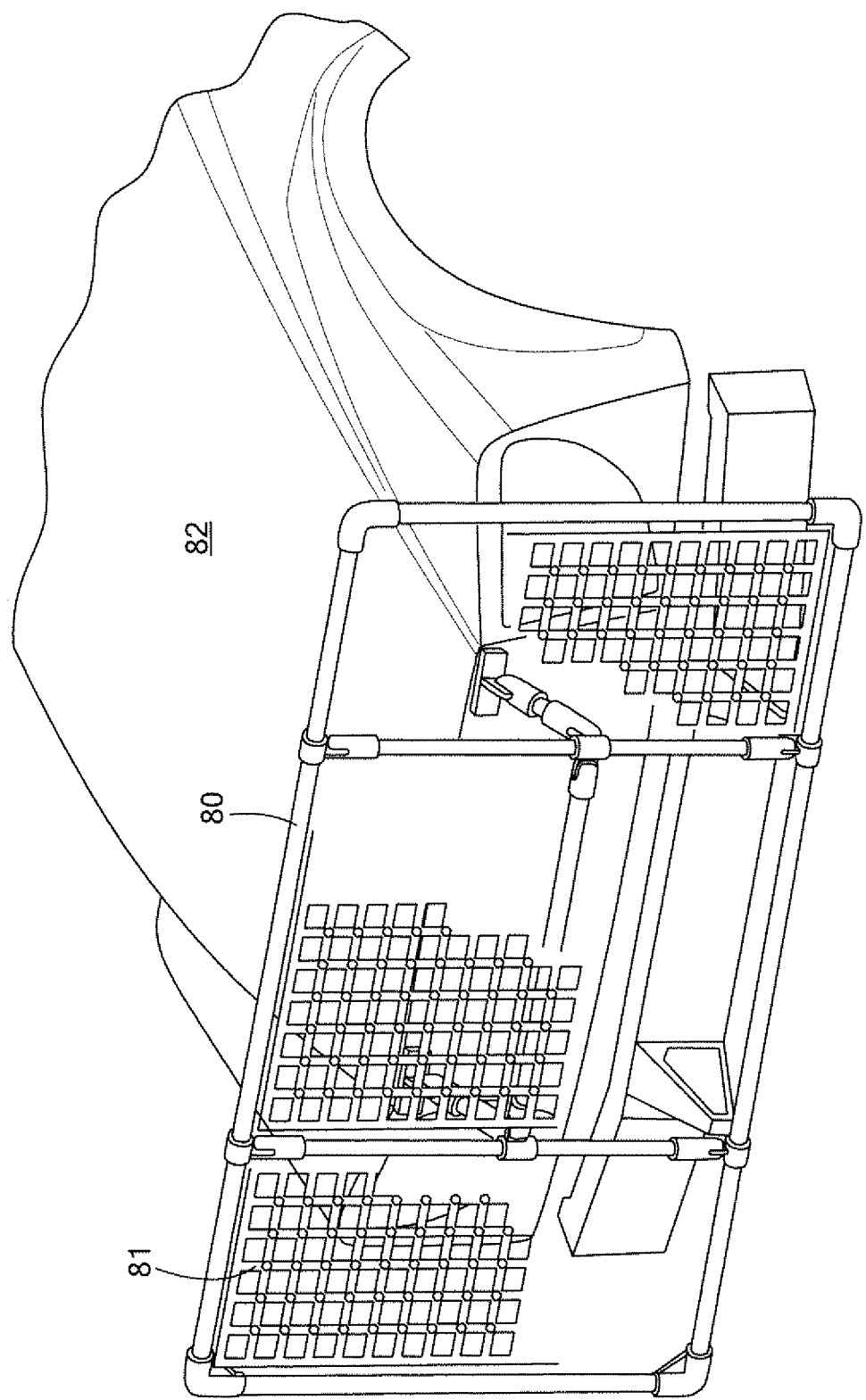
FIG. 7 is a schematic three-dimensional front view showing a vehicle equipped with a shield in accordance with the example of FIG. 1.

In FIG. 7, the film/hard point shield 81 is secured in frame 80 attached to vehicle 82 in such a fashion that the shield is spaced between 100 mm and 600 mm from the vehicle. The film could include a plastic or fabric border and hook and loop touch fastener can be used to secure the border to the metal frame, or similar methods may be used.

The film used may include polymer material such as polyethylene, 0.4 mm thick. The film members in these examples were 7 mm wide and spaced 80 mm apart.

One goal is to make the film members strong enough so that, in the field, the hard points are configured in space adjacent the vehicle to be protected and stay that way as the vehicle maneuvers, is transported, and the like. At the same time, the film members should be weak enough so that an incoming RPG, if it strikes a film member, does not detonate and instead breaks the plastic member. In one example, the breaking strength of each film member is around 330N.

The hard points, when assembled (if assembly is necessary) may be made of steel or tungsten. In one example, each hard point weighed between 10-80 grams, was 12.7 mm-19 mm across and between 12.7 mm-25 mm tall. Preferably, each hard point was between 80 mm-130 mm apart from an adjacent hard point.

The benefits of the design set forth herein may include easier manufacturability and lower cost. The film material supports the spaced array of hard points at a set of distance from a vehicle or structure and the hard points are designed to dig or tear into the nose cone of an RPG and dud it. Such a shield can be manufactured by forming a first film ply to include members interfacing at nodes and placing a hard point at least at select nodes. Then, a second film ply including members intersecting at nodes is placed over the first film ply and the hard points are fixed at their respective nodes. In another example, a film made of one or more plies includes members intersecting at nodes and the hard points each include two halves joinable together at least at select nodes of the film.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A shield comprising:
a film including members intersecting at spaced nodes;
hard points each including two halves on opposite sides of at least select film nodes, one said half including a pin, the other said half including a pin receiving cavity, said pin extending through a film node and received in the pin receiving cavity of the other half, thereby joining the halves together and locking the hard points to the film; and
a frame at least partially about the film for spacing the film from a vehicle or structure to be protected.

2. The shield of claim 1 in which said halves have the same configuration.

3. The shield of claim 1 in which each of said halves include an opening therein.

4. The shield of claim 1 in which each of said halves includes a pin.

5. The shield of claim 1 in which each of said halves is multisided with sharp edges.

6. The shield of claim 3 in which each of said halves include a face with teeth thereon.

7. The shield of claim 1 in which the film is a single ply film.

8. A shield manufacturing method comprising:
forming a film to include members intersecting at nodes;
fabricating hard points each including two halves on opposite sides of at least select nodes of the film;
fabricating said halves to each include a pin receiving cavity; and
joining together the hard point halves via a pin through said at least at select nodes of the film to fix the hard points at their respective nodes.

9. The method of claim 8 in which said halves have the same configuration.

10. The method of claim 8 further including placing a pin in one hard point half, piercing a film node with the pin, and driving the pin into the other hard point half.

11. The method of claim 8 in which said halves each includes a pin.

12. The shield of claim 8 in which each of said halves is multisided with sharp edges.

13. The shield of claim 8 in which each of said halves includes a face with teeth therein.

14. A shield comprising:
a film including members intersecting at spaced nodes;
a hard point including two halves joined together on opposite sides of one of said film nodes;
at least one pin extending through said film and into each of said hard point halves; and
a frame at least partially about the film for spacing the film from a vehicle or structure to be protected.

15. A shield comprising:
a film including members intersecting at spaced nodes;
hard points each including two halves on opposite sides of at least select film nodes, at least one fastener piercing the node and joining the two halves together on opposite sides of the node; and
a frame at least partially about the film for spacing the film from a vehicle or structure to be protected.

16. The shield of claim 15 in which the fastener is a pin.

* * * * *